Jan. 12, 1971  E. C. MILLER  3,553,779

TIRE REPAIR MOLD

Filed Aug. 13, 1968

INVENTOR.
EDWIN C. MILLER
BY
R.H. Washburn
AGENT 3,553,779
TIRE REPAIR MOLD
Edwin C. Miller, La Vale, Md., assignor to The Goodyear Tire & Rubber Company, Akron, Ohio, a corporation of Ohio
Filed Aug. 13, 1968, Ser. No. 752,316
Int. Cl. B27h 5/02
U.S. Cl. 18—18      5 Claims

ABSTRACT OF THE DISCLOSURE

A tire repair mold for repair of small imperfections particularly in the sidewall surface of a tire as a mold element backed by an electrically heated member which is fixed on one arm of a lightweight C-frame to be held onto a spot or blemish on the tire by a presser foot urged toward the mold element by a small, valve-operated air cylinder fixed on the other arm of the C-frame.

---

The foregoing abstract is not to be taken as limiting the invention of this application, and to understand the full nature and extent of the technical disclosure of this application, reference must be made to the accompanying drawings and the following detailed description.

The present invention relates to tire manufacturing and particularly to a device for repairing small defects or blemishes in tire sidewalls.

In the manufacture of pneumatic tires small blemishes or defects occur from time to time, particularly in the sidewalls of tires removed from the curing molds.

It is customary to repair such defects but apparatus heretofore available has not been fully satisfactory. Apparatus has been too large, cumbersome, and inconvenient and has not been adapted to apply heat and pressure precisely, repeatably, and accurately to spot areas desired to be repaired. The synthetic fiber filaments such as the nylons and polyesters now used in pneumatic tires require that heat and pressure be applied precisely to avoid damage to the filaments within the tire such as distortions of the body plies of the tire due to pressure and heat in the process of repair. Tires repaired with such apparatus exhibit marked deterioration in ride quality.

Accordingly, objects of the present invention are to overcome the disadvantages mentioned and to provide a device for repairing blemishes and defects affecting particularly a tire sidewall without harmful effect on the fabric filaments reinforcing the tire.

A further object of the invention is the provision of apparatus which can be readily manipulated and applied to a tire quickly and conveniently to the precise spot thereof desired to be repaired.

Other objects and advantages will be particularly pointed out, or will become apparent from the following description of a preferred embodiment. The description makes reference to the drawings in which.

Figure 1:
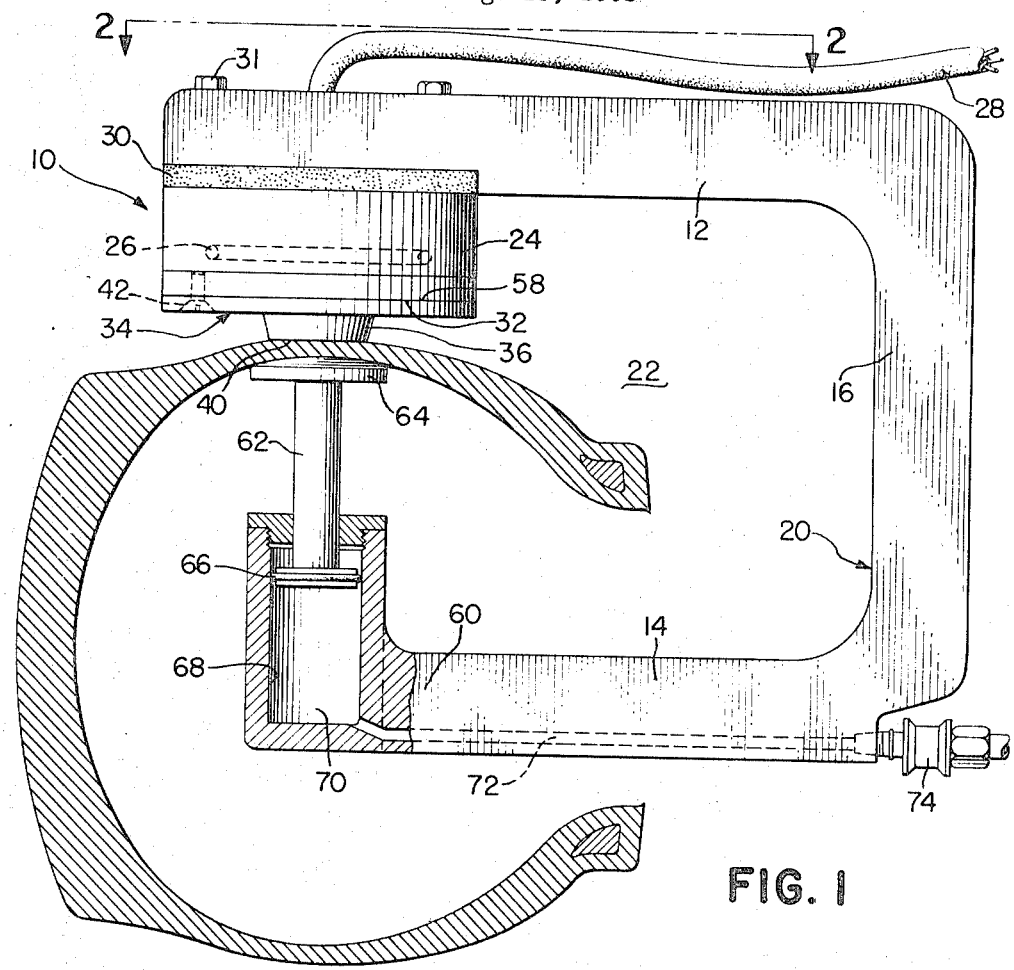
FIG. 1 is an elevation view of a device according to the invention, the view including a partial reduced size cross-section of a tire positioned to be repaired by the device.
Figure 3:
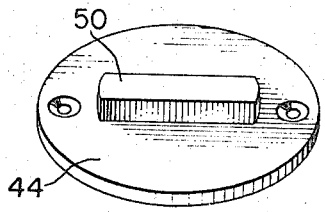
Figure 4:
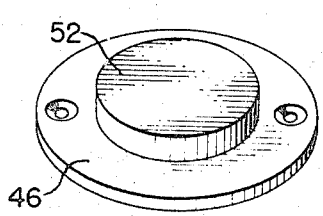
Figure 2:
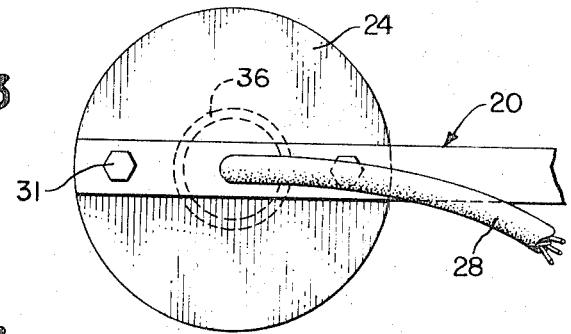
FIG. 2 is a partial plan view of the device of FIG. 1.
Figure 5:
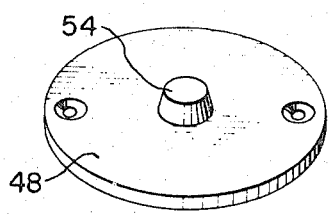

FIGS. 3, 4, and 5 are perspective views respectively of alternative elements used interchangeably in the device of FIG. 1.

Shown in the drawings, and particularly in FIG. 1, a device 10 according to the invention includes frame means comprising an upper member 12, a lower member 14 and a connecting member 16 joined and arranged to provide a unitary frame 20 having generally the shape of a C or a U in elevation. The members are spaced so that the width and depth in the opening 22 of the U shape are sufficient to admit the sidewall of a tire to be repaired into the opening between the upper and lower members 12 and 14. Preferably the frame 20, and the device 10 itself, is small and light in weight so that the device is easily manipulated and may readily be placed precisely with respect to a particular blemish or defect to be repaired.

The upper frame member 12 carries a generally cylindrical head 24 within which is contained heating means in the form of an electrical resistance heater 26 the terminals of which respectively connect with the conductors of a service cord 28 adapted for connection to a suitable source of electrical energy (not shown). An insulating block 30 disposed between the head 24 and the member 12 is secured with the head 24 to the member 12 by cap screws 31. The head 26 is provided with a finished attachment face 32 to which is removably attached shoe means in the form of a disc 34 having a suitably formed raised portion or extension 36 which is provided with a tire sidewall engaging surface 40 of predetermined area and shape. The height of the extension 36, as may be seen in the drawings, enables viewing of the defective spot or area to be repaired so that the device 10 can be accurately placed, and ensures that heat supplied from the heating means or heater 26 is conducted to the predetermined area and shape of the surface 40. The disc 34 is attached to the head by any suitable means, such as the cap screws 42, by which the disc can be quickly and easily removed and replaced with other discs such as the discs 44, 46, 48, shown in FIGS. 3, 4, and 5, by way of example. It is particularly desired that the discs, or plates, be selected to cover an area to be repaired and that the area and shape of the sidewall contacting surface, e.g., surface 40, not overlap significantly on the unblemished adjacent portions of the tire sidewall.

While the sidewall engaging surfaces 40, 50, 52, 54 of the discs 34, 44, 46, 48 are generally, as shown, flat; it is contemplated also within the scope of the invention that discs can be provided with surfaces conforming to other configurations. For example, surfaces having one or more grooves or indentations therein can be applied in the manner described herein to restore or to apply a ridge or ridges or small projections in a spot or area to achieve the desired surface appearance of the tire. Likewise the device can be provided with discs having numerals or other marking symbols, either raised or in relief, on their tire engaging surfaces.

The surface 58 of the disc 34 and the corresponding surface 32 of the head 26 are in firm engagement to provide for uniform and efficient heat transfer so that the heat delivered by the heating means can be precisely controlled and effectively applied to the surface of a tire being repaired. The like surfaces of additional discs such as discs 44, 46 and 48 are preferably identical to the surface 58.

Mounted on the outer extremity 60 of the lower frame member 14, presser foot means comprising a fluid pressure actuated ram 62 having a foot or pressure plate 64 mounted thereon is adapted to move into precise and firm pressure engagement with the inner surface of a tire sidewall opposite the surface 40 of the disc 34. The other end of the ram carries a piston 66 reciprocably disposed within a cylinder 68 for movement therein toward the disc 34 in response to air pressure applied in the head end 70 of the cylinder 68. The ram and piston are returned toward the head end of the cylinder, upon release of air pressure therein, by the action of lifting the upper frame member 12 with the head 24 and disc 34 away from the tire sidewall.

Although the piston 66 can be equipped with a return spring, the device 10 omits a return spring to employ a small cylinder 66, utilizing the air pressure available fully. The presser foot means is thereby made smaller and more easily inserted into the tire cavity.

The foot, or plate, 64 on the ram 62 is provided with a surface, preferably of convex curvature, adapted to bear upon the inner surface of a tire sidewall and to press the sidewall outer surface against the surface 40 of the raised portion or extension 36 of the disc 34.

The lower member 14 is provided with passage means in the form of the hole 72 for the flow of air to and from the head end 70 of the cylinder. Valve means provided by the 3-way slide valve 74 is carried by the frame and is operative to control the admission and release of air to and from the cylinder. The valve 74 is adapted to connect with a supply of fluid under pressure such as a conventional air line, which is regulated by conventional means to adjust the pressure to the cylinder 68. The valve means may be, if desired, incorporated in the body of the frame, and in any case is supported in close association with or carried directly on the frame means itself to provide the convenience for operation thereof when the device 10 is properly located to make the desired repair to a tire sidewall.

In use, the device 10 is first provided with a selected disc selected from a plurality of discs of which disc 34 and FIGS. 3, 4, and 5 are representative. The device is then manipulated to place the surface 40 of the extension 36 of the disc so as to cover, but not excessively overlap, the defect to be repaired. The projection, or extension, 36 of the disc 34 enables an operator readily to see the outline of the defect and to properly position the extension with respect to the defect.

The device 10 being readily manipulated by one hand, the valve 74 is thereupon actuated by the other to move the foot into contact with the corresponding inner surface of the sidewall; an appropriately regulated fluid pressure suited to the particular repair is admitted to the cylinder.

In repairing a defect or blemish in a tire sidewall after a tire molding operation, a suitable amount of repair material will be added to fill and/or cover the defect, particularly in repair of defects involving loss, removal or omission of rubber material from the exposed sidewall surface. Heat supplied is, in accordance with the invention, confined to the immediate area required and to the cure of the added repair material in or on the defect, when such material is added, to accomplish the repair. After an appropriate period of time, air pressure is released and the device is quickly removed from the tire. It is possible and practical with the device to apply the desired heat and pressure simultaneously, or as nearly so as is practically necessary, and to remove both heat and pressure in the same manner after sufficient time has elapsed to provide the conversion of the defect, or blemish. In this way harmful effect upon the synthetic filament material comprising the tire reinforcing is minimized.

While certain representative embodiments and details have been shown for the purpose of illustrating the invention, it will be apparent to those skilled in this art that various changes and modifications may be made therein without departing from the spirit or scope of the invention.

I claim:

1. A device for repairing small defects in the wall of a tire without harmful effect on the fabric reinforcing therewithin comprising frame means including upper and lower members and a connecting member, means including heating means carried by the upper member and providing an attachment surface, shoe means removably attached to said surface and having a tire wall engaging surface, presser foot means carried by the lower member and including a fluid pressure actuated ram having a foot mounted thereon for movement toward and away from the wall engaging surface and adapted to engage an inner surface of a tire and to press the tire engaging surface of said shoe means against a tire wall surface portion opposite said foot.

2. A device as claimed in claim 1, said shoe means being provided with a raised portion having a surface of area and shape adapted to engage an outer surface of a tire to cover a surface of a portion to be repaired without significant overlap on the adjacent unblemished portion of said wall.

3. A device as claimed in claim 1, said ram comprising a cylinder and a piston movable therein normal to the tire wall engaging surface of said shoe means.

4. A device as claimed in claim 1, said frame means including passage means, said heating means comprising an electrical heating element provided with suitable termini for connection to a source of electrical energy, said ram including a cylinder connected to said passage means and a piston having an axis of movement normal to the sidewall engaging surface of said shoe means, and valve means attached to said frame means to communicate with said passage means and operative to actuate said piston in said cylinder.

5. A device for the repair of refects in a tire sidewall, said device comprising a light-weight and easily manipulable frame member generally U-shaper in elevation and having an opening between the legs of the U sufficient to accommodate therein the sidewall portion of a tire to be repaired, means carried by said member at the end of one leg thereof and having a head member including heating means, a plurality of shoe means, said head member having a heatable surface adapted to receive for heat transfer thereto one of said plurality of shoe means, each said shoe means being provided with an elevated surface of area and shape adapted to engage an outer surface of a tire sidewall to cover the surface to be repaired of said wall without significant overlay on the adjacent unblemished surface of said wall, and presser foot means carried by said frame member at the end of the other leg thereof, said presser foot means including air actuated ram means disposed to apply pressure to an inner wall portion of a tire to be repaired to urge an outer surface portion of said tire toward said shoe means, and valve means carried on said frame means and operable selectivity to admit or release air pressure to said ram means.

References Cited

UNITED STATES PATENTS

| 1,628,899 | 5/1927 | Murphy | 18—18 |
| 1,935,872 | 11/1933 | Collins | 18—18 |
| 2,795,007 | 6/1957 | Covert | 18—18 |
| 2,814,073 | 11/1957 | Van Scoyk | 18—18 |
| 2,837,767 | 6/1958 | Mac Donald | 18—18 |
| 2,875,470 | 3/1959 | Goodman | 18—18 |
| 2,894,283 | 7/1959 | Salisbury | 18—18 |

FOREIGN PATENTS

| 213,259 | 2/1961 | Austria | 18—18 |

J. HOWARD FLINT, Jr., Primary Examiner